(12) United States Patent
Chouhan et al.

(10) Patent No.: US 12,216,783 B2
(45) Date of Patent: Feb. 4, 2025

(54) APPARATUS AND METHOD FOR DEFINING AREA OF AUTHORITY FOR USER ACCESS RIGHTS

(71) Applicant: Rakuten Symphony, Inc., Tokyo (JP)

(72) Inventors: Prateek Chouhan, Indore (IN);
Shahajad Hussain, Indore (IN);
Debashis Nanda, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/797,150

(22) PCT Filed: May 18, 2022

(86) PCT No.: PCT/US2022/029755
§ 371 (c)(1),
(2) Date: Aug. 3, 2022

(87) PCT Pub. No.: WO2023/224610
PCT Pub. Date: Nov. 23, 2023

(65) Prior Publication Data
US 2024/0184905 A1    Jun. 6, 2024

(51) Int. Cl.
*G06F 21/00* (2013.01)
*G06F 21/62* (2013.01)

(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 6,202,066 B1 * | 3/2001 | Barkley | G06F 21/6218 707/999.009 |
| 11,783,024 B2 * | 10/2023 | Padmanabhan | H04L 67/306 707/703 |
| 2019/0036957 A1 * | 1/2019 | Smith | H04L 9/3239 |
| 2020/0151670 A1 * | 5/2020 | Chen | G06Q 10/105 |
| 2021/0397626 A1 * | 12/2021 | Griffith | G06F 16/215 |

OTHER PUBLICATIONS

International Search Report dated Sep. 23, 2022 in Application No. PCT/US22/29755.
Written Opinion of the International Searching Authority dated Sep. 23, 2022 in Application No. PCT/US22/29755.

* cited by examiner

*Primary Examiner* — Kendall Dolly
(74) *Attorney, Agent, or Firm* — Sughrue Mion, PLLC

(57) ABSTRACT

A method for setting access rights to project data in an application by defining an area of authority for a user, includes: determining a plurality of fields of data for a project in the application; determining a topology of one or more fields, from among the determined plurality of fields, for which the area of authority is to be settable; setting an area of authority for a registered user of the application, based on a field of the determined topology; and preventing access by the registered user to data for which a value of the field does not comply with the set area of authority.

20 Claims, 8 Drawing Sheets

600

| | | | | |
|---|---|---|---|---|
| Project A | PROJECTS | | | |
| Project A | | | | |
| CUSTOM FIELDS TOPOLOGY STAKEHOLDERS | | | | |
| Level | Type | Field Type | Field Name | Actions |
| 1 | Logical | Program | Full Program visibility | |
| 2 | Logical | SMP | Technology | |
| 3 | Hierarchical | Site | Area | |

520C  520B

Page: 1 ▾  Rows per page 10 ▾  1-3 of 3

FIG. 6

APPARATUS AND METHOD FOR DEFINING AREA OF AUTHORITY FOR USER ACCESS RIGHTS

TECHNICAL FIELD

Aspects of one or more embodiments of the disclosure relate to a software platform for managing data, and in particular, to apparatuses and methods for defining areas of authority to data on a user basis.

BACKGROUND

As technologies such as cloud computing and big data have advanced, commercial software platforms have been developed to help manage workflow, data and business processes in an increasingly digital world. Such software platforms, among other advantages, help to facilitate workflow orchestration, site management, project management, document management, automation, collaboration, engagement, automated data entry, report generation, mobility in field operations, real-time project intelligence, more accurate forecasting, project monitoring, task maintenance, etc. Such software platforms may also help to manage and organize data, improve efficiency and reduce costs for various business operations.

For instance, managing the workflow and associated data for a complex project can be very difficult and labor intensive. As one example, if the particular project is rolling out a wireless communication system over a large region, many aspects of the workflow for the rollout must be managed. For example, the project can be broken down into a predefined hierarchy including various levels such as the Project at the top of the hierarchy, the various Site(s) at different locations (e.g., the physical location for each wireless communication tower), the Site Module Package(s) (SMP) for each Site (e.g., the groups of tasks that need to be completed at each Site), Module(s) (e.g., sub-group of tasks within each SMP), and the particular Task(s) that need to be completed for each Module (e.g., conduct a survey for building the wireless communications tower, installation of the wireless communications tower, commissioning the wireless communications tower, etc.).

A related art workflow or project management application can be used to facilitate a workflow and associated input/output data for a project by providing user interfaces through which project data can be accessed (e.g., viewed, edited, stored, etc.) in a central repository on the basis of the predefined hierarchy. For example, a user can submit queries respectively to access all workflow data corresponding to a particular Project, to access data of a particular Site within a Project, to access data of a particular SMP within a Site of a Project, etc.

In the related art, a user's access rights to data in the system is governed by the role assigned to the user from among a plurality of predetermined roles. More specifically, for a user to access the system, the user must first be registered. At the time of registration, the user is assigned (e.g., by an administrator) a particular role from among a plurality of predefined roles hardcoded into the application at its development. Each of the predefined roles has a set of one or more access rights defined therefor. For example, a Project Administrator role may have the highest level of access rights to data in the system, whereas a Field Engineer may have more limited data visibility rights.

In the related art, however, two users with the same role have the same hardcoded access rights. For example, two field engineers have the same access to the same SMP screens and data and the same Module screens and data, even if the field engineers are from different vendors or sub-contractors and have scopes of work in non-overlapping locations or Sites of the Project. Similarly, it may be desirable to prohibit users from Supplier A from ever accessing Supplier B's information. Or, as another example, it may be desirable to restrict sales-related information to predefined roles.

However, because the roles and their corresponding access right are hardcoded in the application, restricting, varying or fine tuning the access rights of two users of a same role would require reprogramming the application with additional roles and functions. That is, an administrator would have to request the application development team to revise and review the complete code, create and hardcode a new role, test the re-coded application, perform quality assurance processes, etc. Related art project management and workflow applications therefore have a disadvantage in that any specific changes regarding limits to a user's access to data and actions in the platform necessitate a complete sprint development, testing and deployment cycle.

As a result, even small modifications to functionalities and access rights demand many man hours, a lengthy delay, and high operational costs for the time-consuming and tedious process. The inflexibility of related art workflow management applications and the attendant impracticality and high costs of modifications thereto effectively prevent post-development restrictions on and changes to access rights, and result in potential privacy and security breaches or leaks with respect to data accessible via the system.

SUMMARY

Illustrative, non-limiting embodiments of the present disclosure address the above disadvantages and other disadvantages not described above. Also, a non-limiting embodiment is not required to overcome the disadvantages described above, and an illustrative, non-limiting embodiment may not overcome any of the problems described above.

Aspects of one or more example embodiments provide an apparatus and a method for defining and setting areas of authority (or access rights) to data in a system on a user basis, without requiring recoding, redevelopment, and/or redeployment of the application.

Aspects of one or more example embodiments provide an apparatus and a method that eliminate the deployment process and minimize end stakeholder (e.g., registered user) waiting time by enabling an administrator to configure, on-the-fly, areas of authority that limit or define a stakeholder's access to data and actions within various hierarchies of a project.

Further, according to aspects of one or more example embodiments, no technical coding experience is required to configure the areas of authority.

According to one or more example embodiments, a method for setting access rights to project data in an application by defining an area of authority for a user, includes: determining a plurality of fields of data for a project in the application; determining a topology of one or more fields, from among the determined plurality of fields, for which the area of authority is to be settable; setting an area of authority for a registered user of the application, based on a field of the determined topology; and preventing access by the registered user to data for which a value of the field does not comply with the set area of authority.

The project may include a plurality of resource levels; and the determining the plurality of fields may include determining at least one field for each of the plurality of resource levels.

The determining the at least one field for each of the plurality of resource levels may include: outputting a first user interface screen including a plurality of graphical objects respectively corresponding to the plurality of resource levels; receiving at least one user input to add a field to a resource level among the plurality of resource levels; and based on the received at least one user input, adding the field to a graphical object, among the plurality of graphical objects, corresponding to the resource level.

The receiving the at least one user input may include: receiving a first user input requesting to add the field to the resource level; based on the received first user input, outputting a second user interface screen for selecting the field or defining one or more parameters of the field; and receiving at least one second user input for selecting the field, from among one or more predefined fields, or for defining the one or more parameters of the field.

The preventing the access may include preventing the access to the data for which the value of the field at either of a resource level of the data or at a higher resource level above the resource level of the data does not comply with the set area of authority.

The determining the topology may include, for each of the one or more fields, receiving a user selection of at least one of: a topology type; a resource level; and a field from among one or more fields of the resource level.

The setting of the area of authority may include: receiving a user selection of the field, from among the one or more fields included in the determined topology; and receiving a user input of an area of authority value for the field to restrict a data access of the registered user to data for which a value of the field is the area of authority value.

The setting of the area of authority may further include storing information on the field and the area of authority value in association with the registered user in a JavaScript Object Notation (JSON) database.

The information may include at least one of a name of the field, all possible values for the field, the area of authority value, an identifier of a table from where the value can be fetched or read, and a column identifier from where the value can be fetched or read in the table.

The preventing the access may include: determining access rights of the registered user based on a role assigned to the registered user from among a plurality of predefined roles respectively corresponding to a plurality of access rights; and providing access to the data based on the determined access rights of the user and based on a value of the field of the data being equal to the area of authority value.

According to one or more example embodiments, an apparatus for setting access rights to project data in an application by defining an area of authority for a user, includes: a memory storing instructions; and at least one processor configured to execute the instructions to: determine a plurality of fields of data for a project in the application; determine a topology of one or more fields, from among the determined plurality of fields, for which the area of authority is to be settable; set an area of authority for a registered user of the application, based on a field of the determined topology; and prevent access by the registered user to data for which a value of the field does not comply with the set area of authority.

The project may include a plurality of resource levels; and the at least one processor may be configured to execute the instructions to determine at least one field for each of the plurality of resource levels.

The at least one processor may be configured to execute the instructions to: output a first user interface screen including a plurality of graphical objects respectively corresponding to the plurality of resource levels; receive at least one user input to add a field to a resource level among the plurality of resource levels; and based on the received at least one user input, add the field to a graphical object, among the plurality of graphical objects, corresponding to the resource level.

The at least one processor may be configured to execute the instructions to prevent the access to the data for which the value of the field at either of a resource level of the data or at a higher resource level above the resource level of the data does not comply with the set area of authority.

The at least one processor may be configured to execute the instructions to: receive a user selection of the field, from among the one or more fields included in the determined topology; and receive a user input of an area of authority value for the field to restrict a data access of the registered user to data for which a value of the field is the area of authority value.

The at least one processor may be configured to execute the instructions to: determine access rights of the registered user based on a role assigned to the registered user from among a plurality of predefined roles respectively corresponding to a plurality of access rights; and provide access to the data based on the determined access rights of the user and based on a value of the field of the data being equal to the area of authority value.

According to one or more example embodiments, a non-transitory computer-readable recording medium has recorded thereon instruction executable by at least one processor to cause the at least one processor to perform a method for setting access rights to project data in an application by defining an area of authority for a user, the method including: determining a plurality of fields of data for a project in the application; determining a topology of one or more fields, from among the determined plurality of fields, for which the area of authority is to be settable; setting an area of authority for a registered user of the application, based on a field of the determined topology; and preventing access by the registered user to data for which a value of the field does not comply with the set area of authority.

The project may include a plurality of resource levels; and the determining the plurality of fields may include determining at least one field for each of the plurality of resource levels.

The preventing the access may include preventing the access to the data for which the value of the field at either of a resource level of the data or at a higher resource level above the resource level of the data does not comply with the set area of authority.

The setting of the area of authority may include: receiving a user selection of the field, from among the one or more fields included in the determined topology; and receiving a user input of an area of authority value for the field to restrict a data access of the registered user to data for which a value of the field is the area of authority value.

Additional embodiments will be set forth in the description that follows and, in part, will be apparent from the description, and/or may be learned by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 illustrates an example user interface screen through which a topology of custom fields is determined or defined, according to an example embodiment;

DETAILED DESCRIPTION

Figure 1:
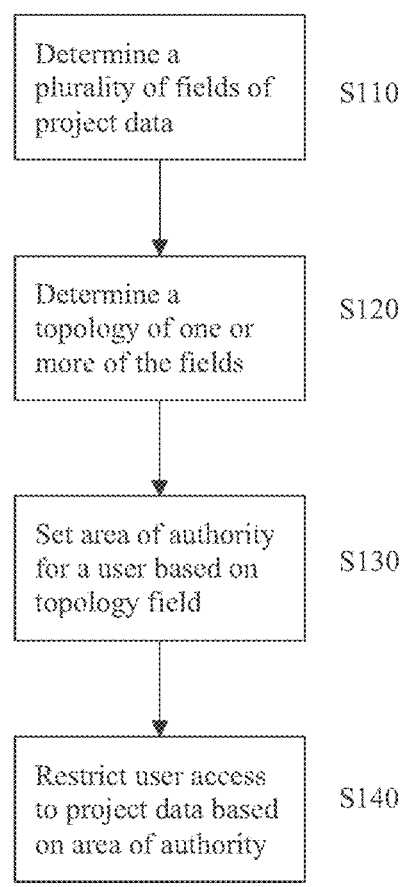
FIG. 1 is a flowchart of a method setting a user's access rights to data by defining an area of authority for the user, according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, data access rights management of a software platform in the related art is fixed to previously-defined and hardcoded roles and associated rights. Thus, two users registered with the same role have the same rights to all the same data in the system. As may often be the case, changes to these rights and/or the creation of new roles or varying rights between users may be desired after the development of the application. But because data access rights are hardcoded in the related art, any such modifications are impractical and require redevelopment, retesting, and redeployment.

Example embodiments provide an apparatus and method that integrates a user-configurable area of authority into data access rights management of a software platform. The area of authority is configurable and fully customizable for each registered user to further define and limit the access rights of that user to data. As a result, access rights can be modified and defined on-the-fly and post-application development without requiring hardcoding of new roles and functionalities and redeployment of the application. As a result, the software platform is more user-friendly, flexible, and convenient to use, data security and privacy is improved (by virtue of increased latitude in setting and defining access rights and restrictions), and time and cost in defining new access rights are reduced.

FIG. 1 is a flowchart of a method 100 for setting a user's access rights to data by defining an area of authority for the user, according to one or more embodiments. The method 100 may be performed via an application that is executed on a user terminal, or an application that is deployed on a server (e.g., in accordance with a microservices architecture) with a frontend displayed on a user terminal (e.g., via a web browser). The method 100 may be performed in a terminal in accordance with the computing environment 200 shown in FIG. 2 (and described in further detail below) and/or in one or more computing devices in accordance with the device 300 shown in FIG. 3 (and described in further detail below).

Referring to FIG. 1, at operation S110, a plurality of fields of data for a project is determined or obtained. In this regard, the plurality of fields may correspond to data input or output fields that are displayable on a screen of the application. Further, the plurality of fields may respectively be associated with columns or fields of a database in which data is stored. In an embodiment, the application may output screens in which a user may input data into respective fields (which may subsequently be stored in corresponding database fields) and/or in which stored data may be obtained (e.g., from corresponding database fields) and output at respective fields. The fields themselves may each be defined with at least one of a field type (e.g., numerical input data, text input data, dropdown menu selectable data, radio button selectable data, etc.), a field label (e.g., a label for the field presented on the output screen in relation to the field), a field descriptor (e.g., a description of the field presented on the output screen in relation to the field), a character limit, etc.

In one or more embodiments, the plurality of fields may include at least one of: fields predefined at the time of the application's development; and fields defined by a user during execution of the application. Further, in one or more embodiments, a user may generate or configure a data input or output screen by selecting or creating the fields that are to be included on the screen. Accordingly, in operation S110, a plurality of fields for one or more screens of the application may be determined. For example, a plurality of fields for a predetermined group of screens may be determined. Stated differently, one or more data fields for each of a plurality of resource levels may be determined in operation S110.

In further detail, the application may provide access to data in accordance with a predefined hierarchy of plural resource levels. To this end, for a particular set of data (e.g., a particular project), one or more fields may be set for each of the plural resource levels. Accordingly, a user can open a particular screen at a particular resource level to access (input or view) data for that resource level. The data that is accessed is defined by the fields determined or set for that resource level.

By way of example, in an embodiment, the application may be an application for managing a workflow of a project, and the plurality of resource levels may include Project at the top, Sites respectively corresponding to physical locations in which the Project is undertaken, Site Module Packages (SMPs) for each Site (e.g., groups of associated tasks that need to be completed at each Site), Modules for each SMP (e.g., sub-groups of tasks within each SMP), and Tasks that need to be completed for each Module. Each of these resource levels has a corresponding set of one or more fields (or custom fields) set by a user. The custom fields may be selected from among a plurality of predefined or previously created fields, and/or may be created (or defined) by the user when defining the fields to be included for the various levels.

Figure 4:
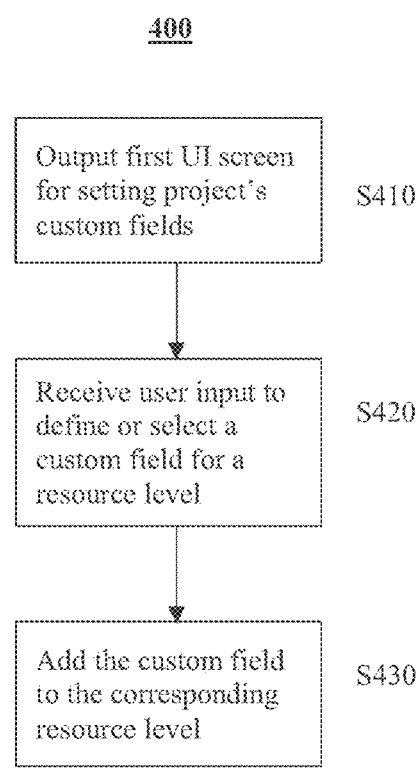
FIG. 4 is a flowchart of a method for determining a plurality of fields of data for a project, according to one or more embodiments.

FIG. 4 is a flowchart of a method 400 for determining a plurality of fields of data for a project, according to one or more embodiments. The method 400 of FIG. 4 may correspond to operation S110 in FIG. 1.

Figure 5:
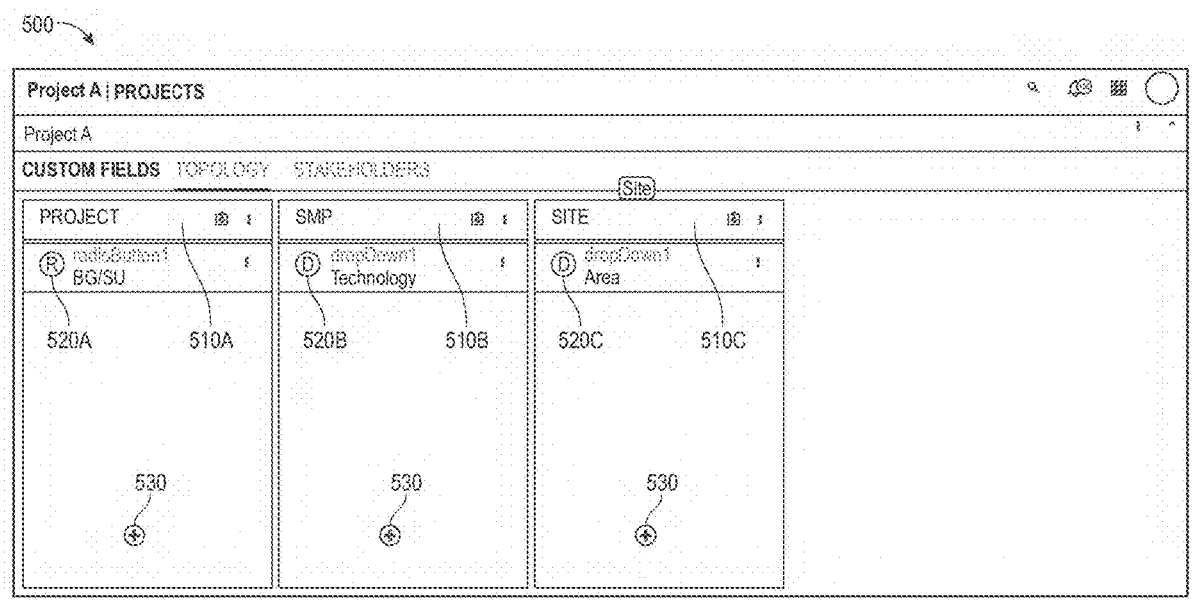
FIG. 5 illustrates an example user interface screen through which custom fields are selected or set for each of a plurality of resource levels, according to an example embodiment.

Referring to FIG. 4, at operation S410, a first user interface screen for setting data fields (or custom fields) for a project is displayed. FIG. 5 illustrates an example first user interface screen 500 through which data fields (or custom fields) are selected or set for each of a plurality of resource levels, according to an example embodiment. As shown in FIG. 5, the first user interface screen 500 includes graphical objects 510A, 510B, 510C respectively corresponding to the plurality of resource levels (e.g., Project, Site, SMP). Within each graphical object 510A, 510B, 510C is one or more fields 520A, 520B, 520C that are set for the corresponding resource level.

At operation S420, at least one user input is received to add a field to a resource level among the plurality of resource levels. For example, a first user input may be received to request addition of a field to a particular resource level. Referring to FIG. 5, the first user input may be made with respect to a particular graphical user interface (GUI) object 530 for adding a field to a resource level. Based on the first user input, a second user interface screen (e.g., a pop-up window or a new screen replacing the first user interface screen 500) may be displayed, through which the field may be selected from among a plurality of previously-defined fields, or through which a new field (or custom field) may be defined by defining one or more parameters (e.g., field type, field label, field description, default value, selectable values, etc.) of the field.

At operation S430, the field is added to a graphical object, among the plurality of graphical objects 510A, 520A, 530A, corresponding to the resource level. The configuration of fields and corresponding resource levels may be saved, e.g., in a table or database (such as a JavaScript Object Notation (JSON) database or table). In this manner, a plurality of fields for a plurality of resource levels of a particular project in the application may be determined and set. Further, where a new field is added to an existing project with existing data entries, the value of that field in the existing data entries for the corresponding resource level may be left blank, may be set as a default value (as set when defining the custom field), may be manually entered one-by-one for each entry, or may be bulk entered for various sets of entries.

Referring back to FIG. 1, at operation S120, a topology of one or more fields, from among the plurality of fields, is determined as fields for which the area of authority is to be settable. In other words, not every field included in a project is selectable for defining access rights according to an embodiment. Rather, a subset or topology of one or more fields is defined by a user (e.g., administrator) as a basis for which stakeholder (i.e., user) access can be restricted.

FIG. 6 illustrates an example of a second user interface screen 600 through which the topology is determined or defined, according to an example embodiment. Through the second user interface screen 600, the user may define the topology by selecting the fields to be included in the topology. To this end, the user may first select a resource level and then select a field from among the one or more fields determined for the resource level in operation S110. Further, the user may select a topology (e.g., logical or hierarchical) for the field. This may be repeated for each of the fields in the topology. The topology may be saved, e.g., in a table or database (such as a JSON database or table).

Referring back to FIG. 1, at operation S130, an area of authority is set for a user or stakeholder, based on a field (or at least one field) of the determined topology. Specifically, the area of authority may be set by setting a value for a field in the topology, which restricts the user's access to only data at the corresponding resource level (and any level below it in the hierarchy) where the value of that field corresponds to the set value.

Figure 7:
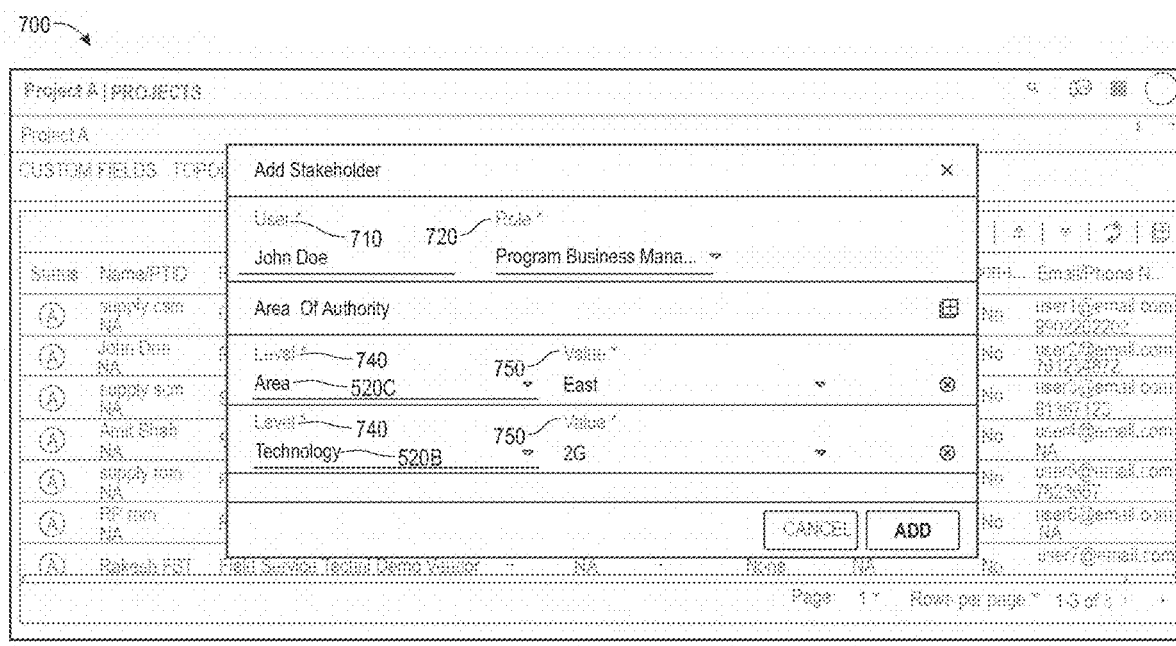
FIG. 7 illustrates an example user interface screen through which an area of authority is set for a user, according to an example embodiment.

FIG. 7 illustrates an example of a third user interface screen 700 through which an area of authority is set for a user, according to an example embodiment. The third user interface screen 700 may be displayed based on a selection (e.g., by an administrator) of a previously-registered user from among a list of previously-registered users, or may be displayed to register a new user to the application or system. The third user interface screen 700 may be provided to define or set parameters of the registered users. For example, a user name can be entered at a User Name field 710, and a role for the user from among a plurality of predefined (and hardcoded) roles may be selected in a Role field 720. Here, the plurality of predefined roles may respectively be associated with a plurality of predefined user access rights to data.

Further, as shown in FIG. 7, one or more areas of authority for the user may be added by selecting an add button 730. In response to selection of the add button 730, the area of authority may be defined (e.g., by an administrator) by selecting a custom field of the determined topology in a Level field 740. Subsequently, a value is selected (e.g., from among a plurality of predefined selectable values for the custom field) or manually input in a Value field 750. This value defines the area of authority or access rights for the registered user (stakeholder) on the corresponding custom field.

In the example of FIG. 7, an area of authority for the Region field (in the Site reference level) is set as North for the user John Doe. Accordingly, John Doe's access rights will be limited or defined by his Role and by this area of authority. Thus, when John Doe subsequently queries or attempts to access Site data for a project, this access will be restricted to only Site data for which the value of the Region field is North.

Further, a plurality of areas of authority may be set for a user with respect to custom fields in a single resource level or across multiple resource levels. For example, with respect to the topology of FIG. 6, a first area of authority can be applied to a Region field in the Site resource level (or field type) and set as "North" and a second area of authority can be applied to a Technology field in the SMP resource level and set as "Radio Unit" for a user John Doe. Subsequently, if John Doe queries or attempts to access Site data for a project, this access will be restricted to only Site data for which the value of the Region field is North. Further, if John Doe queries or attempts to access SMP data for the project, this access will be restricted not only to SMP data for which the value of the Technology field is Radio Unit, but also to such SMP data within Site data for which the value of the Region field is North. In other words, a stakeholder's access to data at a particular resource level is restricted by any area of authority set not just for that resource level, but any resource level above it for the stakeholder.

Figure 8:
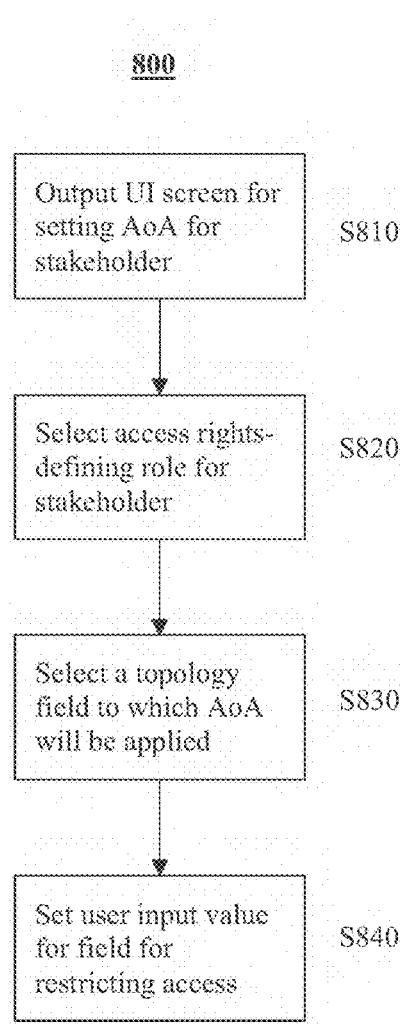
FIG. 8 is a flowchart of a method for setting an area of authority, for a registered user, applied to a custom field of project data, according to one or more embodiments.

FIG. 8 is a flowchart of a method 800 for setting an area of authority, for a registered user, applied to a custom field of project data, according to one or more embodiments. The method 800 of FIG. 8 may correspond to operation S130 in FIG. 1.

Referring to FIG. 8, at operation S810, a third user interface screen (such as the screen 700 shown in FIG. 7) is output for setting an area of authority for a particular stakeholder. The third user interface screen may be a screen for registering a new user (and assigning the user a role from among a plurality of predefined or hardcoded roles) or for modifying parameters of a previously-registered user. The third user interface screen may be accessible to only users with a particular role (e.g., an administrator).

At operation S820, a role, from among a plurality of predefined roles respectively corresponding to a plurality of predefined access rights, is selected for the stakeholder in the third user interface screen. Operation S820 may be omitted, e.g., if the user is previously registered and already has a role set therefor.

At operation S830, a selection of a field, from among the one or more fields included in the determined topology for the corresponding project for which the user is being registered (or is previously registered), is received through the third user interface screen.

At operation S840, a user input of a value (or area of authority value) for the selected field is received to restrict a data access of the stakeholder to data for which a value of the field is equal to the area of authority value.

At operation S850, information on the selected field (custom field) and the value is stored in association with the stakeholder. For example, the information is stored in JSON format and may include all information that maybe used to apply the area of authority. For example, the information may include at least one of the custom field name, all possible values for the custom field, the value input by the user for which the area of authority is applied, an identifier of a table (or database) where the value is stored or can be fetched or read (e.g., corresponding to the resource level of the custom field), and a column identifier in the table from where the value is stored or can be fetched or read dynamically.

Referring back to FIG. 1, at operation S140, access by the user or stakeholder to project data is restricted based on the set area of authority. Specifically, access by the user or stakeholder is prevented for data for which a value of the field on which the area of authority is set for the user does not comply or correspond to the value set in the area of authority in operation S130. Here, it is understood that the user's access rights are not only restricted by the user's role, but also by the area of authority set for the user.

In execution, a user may submit a request or query to access project data at a particular resource level. For example, a user may want to access Site data for a project. In an embodiment, this query may be constructed by loading the user's area of authority information (e.g., stored in JSON format), reading any custom fields and custom field values on which the area of authority is applied and that correspond to the particular resource level (e.g., Site) and any resource level above it, and defining the query by these custom field values (e.g., fetch a list of Sites or Site data for which the value of Region is South). Based on this query, a list of Sites that satisfy these query parameters may be provided, and access to the Site data (e.g., selection of a particular Site to read the values of the fields corresponding to the Site resource level input for that particular site, editing the values, inputting the values, etc.) may be further restricted by the access rights of the user as defined by the user's role (e.g., the user may only be permitted to view, and not to edit, the values of the custom fields in the Site data based on the access rights of the role assigned to the user).

Figure 2:
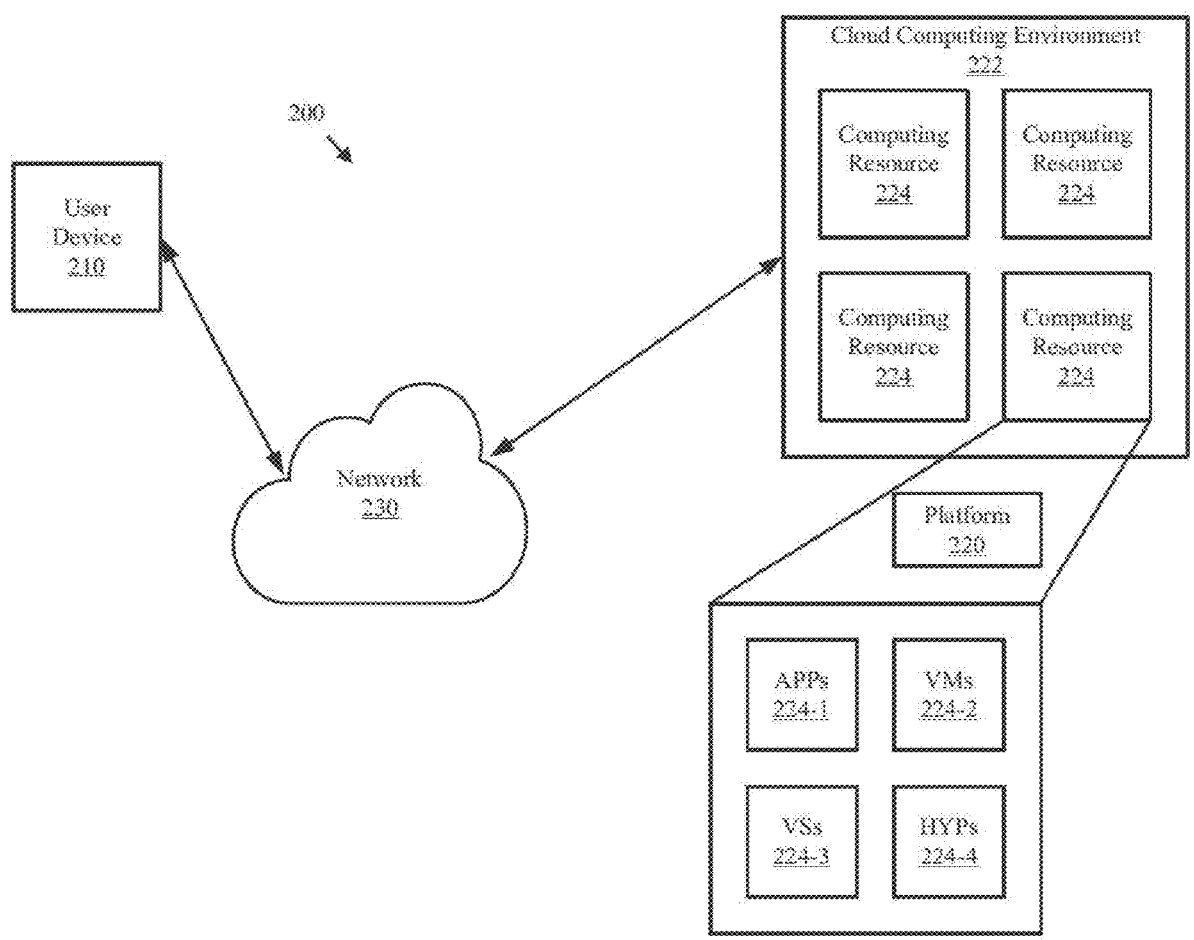
FIG. 2 is a diagram of an example environment in which systems and/or methods according to one or more embodiments may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIGS. 1 and 4-8 above may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
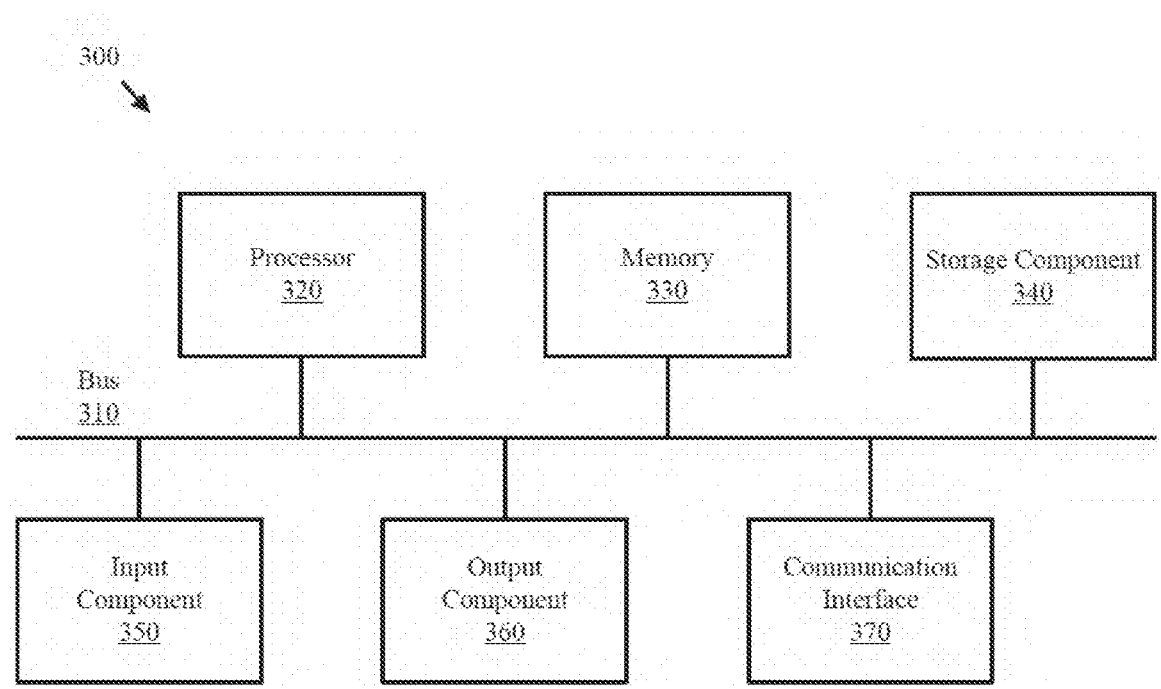
FIG. 3 is a diagram of example components of a device according to an embodiment.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes described above with reference to FIGS. 1 and 4-8 may be implemented by or using any one of the elements illustrated in FIGS. 2-3.

According to example embodiments, access rights of registered users to system or project data may be further defined on-the-fly and post application development by setting an area of authority on a user basis. As a result, modifications to access rights can be made without requiring hardcoding of new roles and functionalities and redeployment of the application. The resulting software platform is more user-friendly, flexible, and convenient to use, data security and privacy is improved (by virtue of increased latitude in setting and defining access rights and restrictions), and time and cost in defining new access rights are reduced.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Embodiments of the disclosure have been shown and described above, however, the embodiments of the disclosure are not limited to the aforementioned specific embodiments. It may be understood that various modifications, substitutions, and improvements can be made by those having ordinary skill in the art in the technical field to which the disclosure belongs, without departing from the spirit of the disclosure as claimed by the appended claims. It should be understood that such modifications, substitutions, and improvements shall fall within the protection scope of the disclosure, and should not to be construed independently from the technical idea or prospect of the disclosure.

What is claimed is:

1. A method for setting access rights to project data in an application by defining an area of authority for a user, the method comprising:
   determining, by at least one processor, a plurality of fields of data for a project in the application;
   determining, by the at least one processor, a topology of one or more fields, from among the determined plurality of fields, for which the area of authority is to be settable, the area of authority being settable on a per-user basis and being settable and changeable on-the-fly and post-development of the application;
   setting, by the at least one processor, an area of authority for a registered user of the application, based on a field of the determined topology, the area of the authority being set for the field based on a user input defining an area of authority value for the field, wherein the area of authority is set on-the-fly and post-development of the application; and
   controlling, by the at least one processor, a graphical user interface of the application to restrict access by the registered user to a database record of the data for which a value of the field does not comply with the set area of authority for the determined topology,
   wherein the database record includes another field, different from the field, such that access to the other field in the database record is restricted based on the value of the field in the database record not being equal to the area of authority value.

2. The method as claimed in claim 1, wherein:
   the project comprises a plurality of resource levels; and
   the determining the plurality of fields comprises determining at least one field for each of the plurality of resource levels.

3. The method as claimed in claim 2, wherein the determining the at least one field for each of the plurality of resource levels comprises:

outputting a first user interface screen including a plurality of graphical objects respectively corresponding to the plurality of resource levels;

receiving at least one user input to add a field to a resource level among the plurality of resource levels; and based on the received at least one user input, adding the field to a graphical object, among the plurality of graphical objects, corresponding to the resource level.

4. The method as claimed in claim 3, wherein the receiving the at least one user input comprises:

receiving a first user input requesting to add the field to the resource level;

based on the received first user input, outputting a second user interface screen for selecting the field or defining one or more parameters of the field; and receiving at least one second user input for selecting the field, from among one or more predefined fields, or for defining the one or more parameters of the field.

5. The method as claimed in claim 2, wherein the restricting the access comprises restricting the access to the database record for which the value of the field at either of a resource level of the data or at a higher resource level above the resource level of the data does not comply with the set area of authority.

6. The method as claimed in claim 1, wherein the determining the topology comprises, for each of the one or more fields, receiving a user selection of at least one of:

a topology type;

a resource level; and a field from among one or more fields of the resource level.

7. The method as claimed in claim 1, wherein the setting of the area of authority comprises:

receiving a user selection of the field, from among the one or more fields included in the determined topology; and receiving the user input of the area of authority value for the field to allow a data access of the registered user to database records of the data for which the value of the field is the area of authority value.

8. The method as claimed in claim 7, wherein the setting of the area of authority further comprises storing information on the field and the area of authority value in association with the registered user in a JavaScript Object Notation (JSON) database.

9. The method as claimed in claim 8, wherein the information comprises at least one of a name of the field, all possible values for the field, the area of authority value, an identifier of a table from where the value can be fetched or read, and a column identifier from where the value can be fetched or read in the table.

10. The method as claimed in 7, wherein the restricting the access comprises:

determining access rights of the registered user based on a role assigned to the registered user from among a plurality of predefined roles respectively corresponding to a plurality of access rights; and providing access to the database record based on the determined access rights of the user and based on the value of the field of the database record being equal to the area of authority value.

11. An apparatus for setting access rights to project data in an application by defining an area of authority for a user, the apparatus comprising:

a memory storing instructions; and at least one processor configured to execute the instructions to:

determine a plurality of fields of data for a project in the application;

determine a topology of one or more fields, from among the determined plurality of fields, for which the area of authority is to be settable, the area of authority being settable on a per-user basis and being settable and changeable on-the-fly and post-development of the application;

set an area of authority for a registered user of the application, based on a field of the determined topology, the area of the authority being set for the field based on a user input defining an area of authority value for the field, wherein the area of authority is set on-the-fly and post-development of the application; and control a graphical user interface of the application to restrict access by the registered user to a database record of the data for which a value of the field does not comply with the set area of authority for the determined topology, wherein the database record includes another field, different from the field, such that access to the other field in the database record is restricted based on the value of the field in the database record not being equal to the area of authority value.

12. The apparatus as claimed in claim 11, wherein:

the project comprises a plurality of resource levels; and the at least one processor is configured to execute the instructions to determine at least one field for each of the plurality of resource levels.

13. The apparatus as claimed in claim 12, wherein the at least one processor is configured to execute the instructions to:

output a first user interface screen including a plurality of graphical objects respectively corresponding to the plurality of resource levels;

receive at least one user input to add a field to a resource level among the plurality of resource levels; and based on the received at least one user input, add the field to a graphical object, among the plurality of graphical objects, corresponding to the resource level.

14. The apparatus as claimed in claim 12, wherein the at least one processor is configured to execute the instructions to restrict the access to the database record for which value of the field at either of a resource level of the data or at a higher resource level above the resource level of the data does not comply with the set area of authority.

15. The apparatus as claimed in claim 11, wherein the at least one processor is configured to execute the instructions to:

receive a user selection of the field, from among the one or more fields included in the determined topology; and receive the user input of the area of authority value for the field to allow a data access of the registered user to database records of the data for which the value of the field is the area of authority value.

16. The apparatus as claimed in claim 15, wherein the at least one processor is configured to execute the instructions to:

determine access rights of the registered user based on a role assigned to the registered user from among a plurality of predefined roles respectively corresponding to a plurality of access rights; and provide access to the database record based on the determined access rights of the user and based on the value of the field of the database record being equal to the area of authority value.

17. A non-transitory computer-readable recording medium having recorded instructions, when executed by at least one processor, cause the at least one processor to perform a method for setting access rights to project data in an application by defining an area of authority for a user, the method comprising:

determining a plurality of fields of data for a project in the application;

determining a topology of one or more fields, from among the determined plurality of fields, for which the area of authority is to be settable, the area of authority being settable on a per-user basis and being settable and changeable on-the-fly and post-development of the application;

setting an area of authority for a registered user of the application, based on a field of the determined topology, the area of the authority being set for the field based on a user input defining an area of authority value for the field, wherein the area of authority is set on-the-fly and post-development of the application; and preventing controlling a graphical user interface of the application to restrict access by the registered user to a database record of the data for which a value of the field does not comply with the set area of authority for the determined topology, wherein the database record includes another field, different from the field, such that access to the other field in the database record is restricted based on the value of the field in the database record not being equal to the area of authority value.

18. The non-transitory computer-readable recording medium as claimed in claim 17, wherein:

the project comprises a plurality of resource levels; and the determining the plurality of fields comprises determining at least one field for each of the plurality of resource levels.

19. The non-transitory computer-readable recording medium as claimed in claim 18, wherein the restricting the access comprises restricting the access to the database record for which the value of the field at either of a resource level of the data or at a higher resource level above the resource level of the data does not comply with the set area of authority.

20. The non-transitory computer-readable recording medium as claimed in claim 17, wherein the setting of the area of authority comprises:

receiving a user selection of the field, from among the one or more fields included in the determined topology; and receiving the user input of the area of authority value for the field to allow a data access of the registered user to database records of the data for which the value of the field is the area of authority value.

* * * * *